Dec. 8, 1931.  W. E. BURKE ET AL  1,835,271

PROCESS OF SELECTIVE CRYSTALLIZATION

Filed March 3, 1930

Inventors
William E. Burke
Charles F. Ritchie
Robert B. Peet
By Lyon & Lyon
Attorneys Patented Dec. 8, 1931

1,835,271

UNITED STATES PATENT OFFICE

WILLIAM E. BURKE, CHARLES F. RITCHIE, AND ROBERT B. PEET, OF TRONA, CALIFORNIA, ASSIGNORS TO AMERICAN POTASH & CHEMICAL CORPORATION, OF TRONA, CALIFORNIA, A CORPORATION OF DELAWARE

PROCESS OF SELECTIVE CRYSTALLIZATION

Application filed March 3, 1930. Serial No. 432,904.

This invention relates to a new and useful process of selective crystallization, by which individual compounds may be separated from a solution containing two or more crystallizable compounds. In many instances there are encountered solutions containing two or more soluble compounds, the solubility characteristics of which are similar. One of the most common methods for recovering soluble compounds from solution is by cooling. If a solution containing two or more compounds is cooled below the point of saturation with respect to compounds having similar solubility characteristics, a precipitate comprising the two compounds will result. Since pure substances are generally desired in commerce, this feature is very undesirable. Tedious, inefficient and costly means of fractional separation have been resorted to in many such cases in the past, in order to prepare pure compounds from such systems.

It is an object of the present invention to provide means by which compounds having similar solubility characteristics may be crystallized from solution and separated one from the other in a simple, economical and effective manner.

Figure 1:
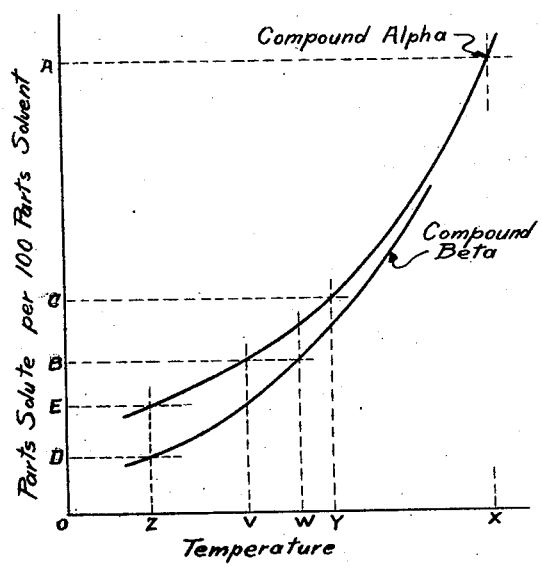

As a specific example, referring to Figure 1, assume a solution to contain C parts of compound alpha and B parts of compound beta, the solution existing at a high temperature, $X°$, said temperature being sufficient to maintain both compounds, alpha and beta, in the solvent. The solution may be cooled to $Y°$ without precipitating either compound. By the usual means of fractional crystallization, a small quantity of compound alpha may be crystallized from solution in pure form by cooling from $Y°$ to $W°$. By ordinary method, known and practiced in the past, further cooling from $W°$ to $Z°$ for the purpose of further crystallizing from the solution additional quantities of compound alpha, results in the precipitation of appreciable quantities of compound beta.

By the process of this invention, it is possible to cool the solution from its elevated temperature, $X°$, to the desired low temperature, $Z°$, and to crystallize therefrom an essentially pure crop of compound beta and an essentially pure crop of compound alpha, said pure crops being amenable to common methods of separation and recovery.

The operation of this invention is predicated upon certain natural laws or phenomena of supersaturation, together with the selection of suitable equipment and means for bringing about the desired results. The concepts of supersaturation and certain of the basic principles pertaining thereto have been recognized by the art for many years, and in the past certain fixed concepts of supersaturation have been set forth. A well known concept is the definition of the metastable field (and metastable limit) of supersaturation as opposed to the labile field of supersaturation. Generally, the term "metastable field of supersaturation" is employed to define the condition of a supersaturated system in which the degree of supersaturation of the solute is insufficient to bring about spontaneous formation of crystal nuclei. The labile field is said to be that region beyond the metastable limit of supersaturation in which the degree of supersaturation of the solute is sufficient to cause the spontaneous formation of crystal nuclei.

While in the past certain very definite lines of demarcation have been employed in applying such concepts to various systems, we are of the belief that such phenomena comprise continuous functions, the constants of which, of course, vary with different systems. We believe that all solutes are capable of some degree of supersaturation in all solvents, that is to say, any saturated system may, under proper conditions, be supercooled to some degree without immediately precipitating the solute. We admit, however, that the degree of supersaturation which it is permissible to incur without exceeding the so-called metastable limit of supersaturation varies over an extremely wide range, and that in many instances said degee is so slight as to be practically negligible. However, we have found that such solutes as potassium chloride and sodium chloride, previously considered as incapable of undergoing supersaturation in aqueous solution, are capable of measurable, though small, degrees of supersaturation under proper conditions. Solutes of the class comprising hydrated salts, double salts, and certain organic compounds are, on the other hand, capable of quite a great degree of metastable supersaturation.

Pursuant with our theory of the continuity of supersaturation phenomena, we believe that the so-called metastable limit of supersaturation constitutes only a special or arbitrary demarcation of a continuous function. We have found that the factors influencing the stability of a supersaturated system, that is, those which define the so-called metastable limit, include the specific nature of the solute and the solvent, time, and the nature of the equipment employed. The concept of the time required for the appearance of crystal nuclei after incuring supersaturation in a system, is one of considerable importance and strongly verifies our theory of continuous functions as opposed to the former precepts embracing the discontinuous idea. For example, if a system such as boric acid in water be supersaturated by cooling in a sealed glass tube under sterile conditions, the time required for the formation of crystal nuclei is found to be a function of the degree of supersaturation incurred; the higher the degree of supersaturation, the more rapid the appearance of crystal nuclei. Usually, a plot or graph of such data wherein degree of supersaturation is plotted against time required for the appearance of crystal nuclei, results in a curve of the general form of a rectangular hyperbola. Since such a curve becomes asymtotic to both axes it may be seen that in the case of high degrees of supersaturation the time required for nuclei formation is negligible, i. e. the system is labile, while in the case of low degrees of supersaturation the time required for nuclei formation becomes infinitely long, and such a system is said to be metastable. The metastable limit of supersaturation may be taken at some point where the time required for nuclei formation becomes relatively short or shorter than is allowable for the fulfillment of certain independently fixed conditions. It is to this definition of the metastable limit of supersaturation that we refer in the following exposition.

The concept of equipment affecting the metastable limit of supersaturation is likewise of importance. It has been found that the time required for the induction of crystal nuclei varies with the conditions employed: a system may be found to be metastable under one set of conditions and labile under another. Supersaturated solutions are extremely sensitive to mechanical stimulus. Mechanical stimulus may be brought about in a large number of manners, such as, for example, the setting up of strong impulse waves within the system, and by the force of two substances rubbing the one against the other. A well known example of the latter is the trick employed by the chemist, of scratching the inside of a beaker with a stirring rod to induce crystallization from supersaturated solution. In general, the more supersaturated the system, the more labile it becomes under conditions of mechanical stimulus. While it has long been considered that in order to produce metastable systems, freedom from crystal nuclei is essential, this is not necessarily true in total. We have been able to produce supersaturated systems in the presence of crystals of the supersaturant, which, (with the exception of the normal deposition upon the crystals present), were entirely metastable and could be so maintained over long periods of time. However, we have found that mechanical stimulus, under such conditions is most active in destroying supersaturation or, in other words, in decreasing the metastable limit of supersaturation. This phenomenon, like others described, comprises a continuous function; that is, it is dependent upon the degree of mechanical stimulus involved.

It is upon the foregoing principles that the present invention is predicated. In short our invention comprises crystallizing in a common vessel and in the presence of each other the two compounds alpha and beta, having similar solubility characteristics. By the process of this invention, one compound is caused to form upon a predetermined seed bed in the form of large crystals, while the other is caused to form as relatively fine crystals, which are subsequently separated from the large crystals by suitable means, such as hydraulic classification, screening, sedimentation, etc. While the steps of the process may be carried out in a batch or in a continuous manner, the latter is preferable from the standpoint of economy, labor and control. Hence, the following exposition is set forth in such terms.

By the operation of this invention, the solution described above with reference to Figure 1 is cooled to Z°, thereby producing supersaturation (B—D parts) with respect to compound beta. The supercooled solution is then passed into a suitable crystallizer, the details of which are described hereinbelow, wherein the supersaturation value of compound beta (B—D parts) is caused to deposit upon a seed bed of already formed beta crystals, while the content of compound alpha is carried from said chystallizer as a suspension of fine crystals.

The action just described is brought about by taking advantage of the principles hereinbefore set forth. The solution is caused to become supersaturated to the degree of B—D parts of compound beta. It is necessary that this degree of supersaturation should be well within the aforedescribed metastable field; i. e. it should be capable of remaining in a supersaturated state for an appreciable length of time without forming, spontaneously, appreciable quantities of crystal nuclei. Likewise, the degree of supersaturation should be such that the effect of mechanical stimulus brought into play in the crystallizer is small as compared with the rate of crystal growth of the supersaturant upon the seed bed of compound beta in the crystallizer.

By taking advantage of the opposite phenomenon, compound alpha is caused to precipitate as fine crystals, being, in the case of continuous operation, subsequently removed from the crystallizer by the flow of liquor. In cooling the solution to Z°, it is necessary that a state of supersaturation with respect to compound alpha be produced which is labile. By labile, we here refer to a system supersaturated to such an extent that the time element required for nuclei formation, either spontaneously or abetted by mechanical stimulus and the presence of like crystals, is so small as to cause the desired results, as herein described, to be brought forth.

The production of a labile state, of course, depends to a large extent upon the solute itself. In many cases the concentration of compound alpha, C parts, is sufficient to produce a labile system with respect to that compound when the solution is cooled to Z°. However, we have encountered cases in which compound alpha possessed supersaturation characteristics similar to those of compound beta. In such a case, it may be advisable to add to the solution, prior to the described manipulations, a sufficient quantity of one compound, alpha for example, to produce the desired degree of supersaturation, that is, to produce a labile system with respect to compound alpha.

For example, A—C parts of compound alpha may be added to a unit quantity of the solution, said solution being at X°, to produce a system containing A parts of compound alpha and B parts of compound beta. This solution, when cooled to Z°, acquires a relatively great degree of supersaturation (A—E parts) with respect to compound alpha and a relatively small degree of supersaturation (B—D parts) with respect to compound beta, and behaves in the manner desired when processed as just described.

With the system so adjusted as to possess a relatively stable or a metastable degree of supersaturation with respect to compound beta and an instable or labile state with respect to compound alpha, the cold solution is caused to pass through a bed of relatively large crystals of compound beta. This is best accomplished by introducing the liquor at the lower extremity of a cylindrical crystallizing vessel in such a manner that the liquor is caused to flow upward through the crystal bed of compound beta. This crystal bed serves as a medium upon which the metastable beta content of the liquor may be deposited in an orderly and controlled fashion. On the other hand there are no large seeds or crystal bed of compound alpha provided within the crystallizer. Hence, in the usual manner of labile solutions, spontaneous crystallization takes place, with an attendant formation of an enormous quantity of extremely fine crystals. This formation of fine crystals is promoted by the mechanical stimulus set up within the crystallizer by suitable agitators together with the internal abrasion set up by the rapid passage of the liquor between the interstices of the suspended seed crystals of compound beta.

By these means the crystallizable content of compound alpha is caused to precipitate as fine crystals. These fines are caused to be carried upward with the liquor stream, and therewith carried from the crystallizer. The fine crystals of compound alpha may be subsequently recovered from the mother liquor by sedimentation, filtration, centrifugation or other known and suitable means. In this manner the process of the present invention serves to separate from a solution, simultaneously separating the one from the other, two substances having similar solubility characteristics.

The type of crystallizer employed is of little importance as long as the conditions imposed by the system involved are successfully fulfilled. The volume of the seed bed, of beta crystals for instance, must be sufficient to insure satisfactory removal of the supersaturation of compound beta from the liquor. The ratio of height of the crystallizer to its volume is determined by the size of the crystals of compound alpha produced. It is requisite of the present system that the crystals of compound alpha produced in the cooling and crystallizing operations shall be substantially smaller that those of compound beta. In the case described, these are removed from the crystallizer and from the beta crystals by means of the liquor stream. Hence, the size of the alpha crystals produced determines the minimum velocity of upward flow of liquor required for their hydraulic removal. If the alpha crystals are fine, a relatively slow moving stream of liquor is sufficient; if relatively large, a liquor stream of higher velocity is demanded. These functions of course are in part dependent upon the solute involved and its degree of supersaturation or concentration, as well as the density and viscosity of the mother liquor.

The choice of the method of cooling is likewise a consideration dependent upon specific conditions. The conventional type of double pipe cooler has been found quite satisfactory in the case of continuous operation. This type of cooler is shown somewhat diagrammatically in Figure 2. Hot liquor from a suitable storage tank 19 is passed by a pump 18, into the inner pipes of a double pipe cooler unit 20. Cold brine or other suitable cooling medium is introduced into the outer pipes at point 16. Cold brine passes counter-currently to the hot liquor and leaves the unit at point 15.

Single pipe coolers immersed in or splashed with cooling medium have also been employed. Preferably the cooling units should be external to the crystallizer proper, in order to facilitate cleaning and repairing; but, in certain instances, the cooling means may be incorporated within the crystallizer itself. In other cases cooling of hot liquor by subjecting the same to reduced pressure has been found very economical and advantageous.

According to the precepts of supersaturation hereinbefore set forth, the rate of discharge or precipitation of the supersaturation with respect to compound alpha depends upon a number of factors. In many instances the precipitation is almost instantaneous, even to the extent of taking place within the cooling units. In other cases where compound alpha shows a strong tendency toward metastable supersaturation, the rate of precipitation is less rapid. It is paramount that a large quantity of crystal nuclei or seeds of compound alpha be present within the crystallizer, which seeds may be formed by means of rapid and spontaneous crystallization. As the greater portion of the supersaturation is discharged in this form, the system may resolve itself into one containing small supersaturation values, both with respect to compound alpha and compound beta. Such conditions are proper for the orderly growth of these substances upon their respective like seeds, without further spontaneous crystallization. However, at this point, there must be present within the crystallizer a very large number of very fine crystal nuclei of compound alpha, upon which the residual small degree of supersaturation may be deposited. This relatively small addition of mass to the fine crystal nuclei of compound alpha already present is so small as compared to the total mass of the same, that the size of the individual particles is not materially increased thereby.

In certain cases where it has been imperative to cool the solution to $Z°$ for the removal of stated quantities of the compounds, it has been found that the degree of supersaturation with respect to compound beta so produced (B—D parts) was in excess of the metastable limit. That is to say, with such a degree of supersaturation orderly deposition of compound beta upon the seeds thereof in the crystallizing vessel would not take place; but spontaneous crystallization ensued, causing fine crystals of compound beta to be formed and carried from the crystallizer with the outgoing liquor together with the fine crystals of compound alpha. Since the operation of this invention depends upon the principles of forming large crystals of one compound upon a predetermined seed bed and the crystallizing of the other compound in the form of fine crystals, amenable to physical separation from the former; the aforementioned result would tend to defeat the purpose of this invention.

To circumvent this fault we first cool the solution containing, for example, A parts of compound alpha and B parts of compound beta from its elevated temperature $X°$ to some temperature $V°$, short of $Z°$. By cooling only to $V°$ instead of $Z°$ a lesser degree of supersaturation with respect to compound beta is produced, said degree of supersaturation being sufficient to prevent spontaneous crystallization or nuclei formation of compound beta, insuring an orderly growth of the same upon the seed bed within the crystallizer. This solution is passed to the crystallizer where the deposition of compound beta proceeds, the desired crystallization of fine crystals of compound alpha also taking place. Solution from which the supersaturation values with respect to $V°$ of compound beta have been removed, may then be further cooled to a lower temperature (e. g. to $Z°$) and passed to another crystallizer for a repetition of the process.

In certain cases it may be necessary to reheat the outflowing liquor from the first crystallizer from $V°$ to $X°$ and subsequently re-cool the same to some temperature below $V°$ (e. g. to $Z°$) prior to passing the same to a second crystallizer. However, in most cases it is only necessary to cool the liquor leaving the first crystallizer at $V°$ down to $Z°$. This liquor, of course, carries in suspension the entire crop (A—B parts) of compound alpha precipitated at $V°$ in the form of very fine crystals. If these crystals are of such number or size that the further addition of B—E parts of compound alpha thereupon does not materially alter their mass; then further heating to $X°$ and recooling to $Z°$ becomes unnecessary. This will evidently be true even when the degree of supersaturation of B—E parts of compound alpha, produced by cooling from $V°$ to $Z°$, is within the metastable field of supersaturation.

An examination of the number-size-mass relationships of crystals is enlightening. If seeds of even relatively large diameter, e. g. −100 +150 mesh, having an average diameter of 0.12 millimeters, are formed in the first stage of cooling from X° to V°, by the crystallization of A—B parts of compound alpha, then it would be necessary to add thereto approximately three times the weight of material already brought out of solution, i. e. 3 (A—B) parts compound alpha, in order to grow these seeds from −100 +150 mesh to −65 +100 mesh, which corresponds to an average diameter of about 0.18 millimeters. Thus it is seen that approximately 300% increase in mass is required to effect a 50% increase in diameter of the individual crystals.

Considerations of the above nature have led us to another modification of the process of our invention, which has proven very useful in certain cases. By means of this modification, we do not have to depend entirely upon the spontaneous formation of a multiplicity of fine seeds from the major body of the liquor. For example, referring to our original example of a liquor containing C parts of compound alpha and B parts of compound beta, this liquor is cooled to Y° or lower, and there is added thereto a sufficient weight, say, for example, 1/3 of C—E parts of fine (−100 +150 mesh) crystals of compound alpha. A very much lesser quantity of finer alpha crystals may be added if such are more convenient. The resulting treated solution may then be cooled and crystallized as described hereinbefore, causing the precipitation of the metastable compound beta upon large seed crystals of the same contained within the body of the crystallizer, further causing the precipitation of the content of compound alpha as fine crystals which are subsequently separated from the large crystals of compound beta (in the case of continuous operation, by means of the upflowing stream of liquor).

The fine crystals of compound alpha, added in such number that the total growth of alpha from the solution thereupon will not materially alter the individual size thereof, may be produced in a variety of ways. A simple and obvious method comprises grinding large crystals of compound alpha, either dry or in a suitable mill as a wet pulp. A very satisfactory method for producing the desired quantity of fine alpha crystals is based upon the principles set forth hereinbefore. A small quantity of a suitable solvent is saturated with a large amount of compound alpha at a suitably high temperature, say X° or higher. This hot concentrated liquor is then cooled rapidly to some suitable temperature, W° for instance. Mechanical stimulus, high supersaturation and rapid cooling are employed to bring about spontaneous crystallization of a multiplicity of extremely fine alpha crystals. The resulting sludge of fine alpha crystal may be added to the main body of the multi-component liquor, at a temperature, such as Y° or lower, sufficient to prevent dissolution.

This preferred variation of the process of our invention has an obvious advantage over the aforementioned step wherein the entire solution is treated with an excess of compound alpha in order to insure the formation of the desired crop of fine alpha crystals spontaneously, solely by the production of a highly labile system. By the preferred means only a relatively small quantity of material must be handled, heated and cooled, as compared with treating the entire body as aforedescribed. The former process, however, possesses practical utility in cases where recrystallization of impure compound alpha must be realized, and may be accomplished to advantage by combination with such a step.

In the practice of this invention it is necessary to supply to the crystallizer relatively large beta seed crystals. Except in rare cases, the beta seed crystals are not formed spontaneously and furthermore the volume and size thereof must increase with the extraction of beta values from the metastable solution. Therefore, it is usually necessary to continually add to the crystallizer, seed crystals of compound beta and to continually remove therefrom the enlarged crystals. In the case of continuous operation, the size of the seed crystals of compound beta is dependent upon the rate of flow of the liquor. These seed crystals must be of sufficient size to remain within the crystallizer against the force of the upward flowing stream of liquor. We prefer to utilize the smallest beta seed possible in order to take advantage of the greatest growth factor, and consequently the least addition of seeds. The linear velocity of the upward stream of liquor, for a given volume flow, depends upon the size of the alpha crystals present; hence, the minimum size of the beta seed crystals is a dependent, rather than an independent, function of the system as a whole. We have found crystals of size −20 +28 mesh or about 0.71 millimeters diameter to be suitable as seed in most cases. If these crystals are grown to size −8 +10 mesh or about 2.0 millimeters diameter (or side length), it is necessary to supply approximately 100 pounds of the finer mesh crystals (0.71 mm.) for every ton of large (2.0 mm.) crystals removed from the crystallizer. If smaller seed crystals are permissible, then less weight thereof is required.

The requisite beta seed crystals may be obtained by crushing and screening, if necessary, to suitable size a small portion of the product removed from the crystallizer. As previously set forth, such details are dependent upon a large number of factors, some dependent and some independent, and we wish to be understood that such details as herein set forth are not to be construed as limitations of the scope of this invention, that the invention rests solely upon the principles herein set forth and as claimed hereinbelow.

As an example of the application of this invention to one specific problem of selective crystallization, we will describe it as we have applied it, in one instance, to the separation and recovery of borax,

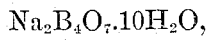

and the hydrated double salt of trisodium phosphate and sodium metaborate,

from liquor obtained by the concentration and manipulation of Searles Lake brine. This concentrated liquor contained 250 grams of borax (10.4% $Na_2B_4O_7$) and 55 grams of the double salt (0.545% $P_2O_5$) per liter, together with considerable quantities of sodium chloride, sodium carbonate, sodium metaborate, potassium chloride, organic matter and other impurities and had an approximate specific gravity at 60° C. of 1.3. This liquor was cooled from approximately 60° C. to a point sufficiently below 22.5° C., that the liquor emerging from the crystallizer at point 13, Figure 2 was approximately 22.5° C. Several degrees of excess cooling must be supplied to counteract the effect of the heat of crystallization of the salts in question. The cold liquor was passed through a crystallizer of the general construction and arrangement illustrated in Figure 2 of the drawings containing a bed of crystals 14, of the hydrated double salt of trisodium phosphate and sodium metaborate. The crystallizer had a horizontal cross section of two square meters. The vertical distance between the centers of the liquor inlet and the liquor outlet, (distance from 17 to 13, Figure 2), was 12 meters. The bed of crystals of the hydrated double salt of trisodium phosphate and sodium metaborate was maintained so that when the cooled liquor was supplied to the bottom of the crystallizer at the rate of approximately 200 liters per minute the upper surface of the seed bed stood about 2 meters below the liquor outlet 13, Figure 2. At the rate of 200 liters per minute, the average upward linear velocity in the upper two meters of the crystallizer (above the seed bed) was 10 centimeters per minute. Throughout the seed bed the linear rate of flow was considerably greater than 10 centimeters per minute, being dependent upon the size of the crystals in the bed. The crystals of the double salt in the seed bed were maintained so that a screen analysis showed them to lie between the range of 8 mesh and 35 mesh, that is to say, the crystals all passed through the opening of the 8 mesh screen, 2.36 millimeters, and none of them passed through the opening of the 35 mesh screen, .417 millimeters. Crystals of such size as would pass through a 150 mesh screen opening, 0.104 millimeters, were found to be carried out of the crystallizer by the upward flow of 10 centimers per minute of liquor leaving the crystallizer, the borax crystallized being so removed.

At the net effective temperature of cooling, 22.5° C. the liquor contained an equivalent supersaturation of about 155 grams of borax and about 35 grams of the double salt per liter in excess of the amount of these substances in approximate equilibrium with the solids at that temperature; this amount representing the degree of equivalent supersaturation of the liquor with respect to these substances at that temperature. Other substances contained in the liquor were of sufficiently low concentration that the cold liquor was unsaturated therewith.

Figure 2:
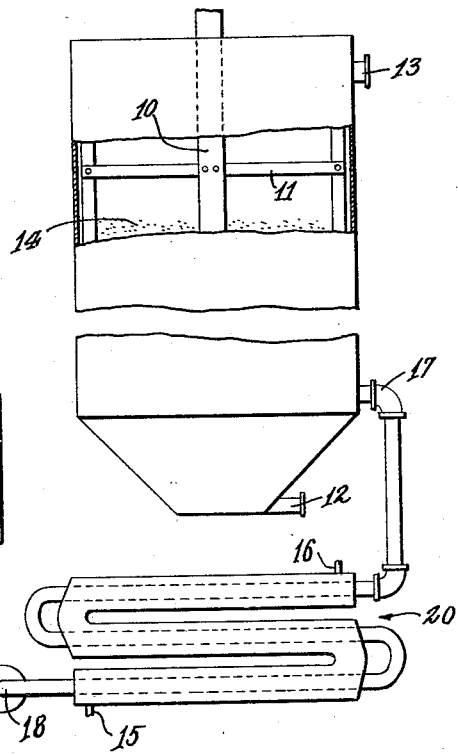

Large crystals of the hydrated double salt were withdrawn from the bottom of the crystallizer at point 12, Figure 2, at the net rate of about (exclusive seed added) 400 kilograms per hour.

The liquor overflowing the crystallizer, carrying in suspension the fine borax crystals, was first passed to a continuous thickening equipment of well-known design. A thickened sludge of borax crystals and liquor was then passed to a continuous vacuum filter for the final separation of solids and liquids. Clear liquor from this crystallization and separation process was then returned to evaporators for the concentration and recovery of residual values. Essentially pure borax is recovered by these means. By applying a displacing wash of water to the borax crystals on the filter for the purpose of removing adhering mother liquor, a high grade borax, free from the phosphate double salt, is obtained, which with the customary drying and packing is suitable for the market.

In certain cases we have found it advantageous to dispense with the thickening equipment, the liquor overflowing the upper part of the crystallizer passing directly to a suitable filter or centrifugal for separation of the fine crystals from the liquor.

While it is not specifically the purpose of this description to claim details of crystallizer construction, it may be noted that we have found it advisable to provide means for the prevention of channeling of the liquor stream within the crystallizer. While Figure 2 shows diagrammatically only one liquor inlet 17 we have found that a plurality of the same circumferentially spaced apart is an effective aid in securing good liquor distribution. Likewise, a plurality of overflow lines 13 or a circumferential launder may be employed to advantage. Paddles or stirring mechanism 11 affixed to a rotating shaft 10, are supplied for the purpose of keeping the crystal bed mixed and preventing the channeling of liquor through the crystal bed. This stirrer, although operated at a relatively low speed, serves as an aid to the production of the mechanical stimulus desired for the production of the fine borax crystals.

The means provided for preventing short circuiting or channeling of the liquor also aids in bringing about the desired hydraulic classification within the crystallizer, not only with regard to the fine borax crystals, but also with respect to the large seed crystals of the double salt maintained within the crystallizer. By means of this hydraulic classification, the largest crystals of the seed bed are caused to work their way to the lower extremity of the crystallizer, from which they may be withdrawn continually.

The greater portion of the large crystals of the double salt withdrawn from the lower extremity of the crystallizer are separated from the relatively small amount of accompanying liquor on a filter, drain table or a centrifugal. They may be given a slight wash with water for further purification, then dried and sacked for shipment.

Approximately 40 kilograms per hour of the large seeds are crushed to approximately 35 mesh and returned to the upper portion of the crystallizer for seed. While, theoretically, only about four kilograms per hour is required, imperfect classification and the removal of crystals of smaller size than 2.31 millimeters requires the addition of this larger quantity of seed.

In the foregoing description of the case wherein the degree of supersaturation with respect to compound beta produced by cooling to $Z°$ was in excess of the metastable limit, we have shown it to be necessary to reduce this degree of supersaturation in order to insure successful deposition of the compound beta upon the bed of crystals contained within the body of the crystallizer. In the instance described the solution was cooled only to $V°$ for the first crystallizing step, followed by a cooling $Z°$ and a second crystallizing step.

While two steps were selected for illustration, it may be possible that a greater number would be required in order to avoid incurring too great a degree of supersaturation in any single step. One disadvantage of such a process resides in the fact that plurality of duplicated units are required. We have found, however, that the multistep process may be accomplished in effect, in a single unit. To this end liquor at $Z°$ overflowing the crystallizer at point 13 of Figure 2 is in part returned to the feed tank 19. To stimulate for instance, the two-step process hereinbefore described, a volume of overflow liquor equal to the volume of fresh liquor is employed. Obviously the overflow liquor at $Z°$ is only saturated with respect to compound beta, containing D parts per 100 parts of solvent. Mixing this liquor with an equal volume of fresh liquor containing B parts of compound beta per 100 parts of solvent, results in a system containing approximately one half as much potential supersaturation value as the original liquor or $$\frac{B-D}{2}$$

parts beta per 100 parts of solvent. By these means the desired degree of supersaturation with respect to compound beta may be regulated at will. The ratio of the overflow liquor circulated to the fresh liquor supplied automatically fixes the degree of supersaturation of the feed liquor with respect to compound beta. Manipulation of the liquor for the purpose of obtaining the desired small crystals of compound alpha may be carried out in any of various methods hereinbefore set forth. By this process of our invention we are able to crystallize at a specified temperature, and in a single installation of machinery, two compounds from solution, said compounds having similar solubility characteristics, and to separate to a substantial degree of purity the one compound from the other.

The process of this invention may also be applied to the selective crystallization of a given compound from a solution containing two or more other crystallizable compounds. In such instance it is necessary to cause the formation of fine crystals of the two or more other compounds while causing the orderly and regulated deposition of the one compound upon a predetermined seed bed, according to the principles hereinbefore set forth. The economical limit of manipulations is, of course, determined by the value of the compounds at stake, and by comparison with other chemical and physical separation processes, made available by the increasing number of possibilities.

While the particular process herein described is well adapted to carry out the objects of the present invention, it is to be understood that various modifications and changes may be made without departing from the spirit of the invention, and the invention is of the scope of the appended claims.

We claim:

1. A process of crystallizing simultaneously two different substances from solution which includes, precipitating one substance as relatively fine crystals from a solution maintained within the metastable limit of supersaturation with respect to the other substance, while maintaining sufficient relatively large crystals of said latter substance present as to precipitate said latter substance by deposit upon and growth of such relatively large crystals, whereby the two substances are simultaneously obtained as crystals of distinctly different sizes.

2. A process of separating two substances which crystallize simultaneously from solution which includes, precipitating one substance as relatively fine crystals from a solution which is maintained within the metastable limit of supersaturation with respect to the other substance, and while maintaining sufficient relatively large crystals of said latter substance in contact with said solution as to precipitate such latter substance by deposit upon and growth of such relatively large crystals, whereby the two different substances are simultaneously obtained as crystals of distinctly different sizes, and separating the crystals by hydraulic classification.

3. A process of the class described which includes, precipitating one substance from solution as relatively fine crystals which solution is maintained within the metastable limit of supersaturation with respect to the other substance, and while passing the solution upwardly through sufficient relatively large crystals of said latter substance as to precipitate said latter substance by deposit upon and growth of such relatively large crystals, the flow of solution by such crystals of the latter substance being at a rate sufficient to carry away the relatively fine crystals of the former substance without carrying away the relatively large crystals of the latter substance.

4. A process of crystallizing substances from solution which comprises, passing the solution of two different substances to be precipitated at one condition of temperature and concentration to a body of said liquor at another condition of temperature and concentration, such as will cause the feed liquor to exceed the metastable limit of supersaturation if brought to such condition of temperature and concentration in one separate operation, while circulating from the body of the liquor in the crystallizing zone sufficient of said liquor to re-enter with the fresh liquor as to maintain the liquor in the crystallizing zone within the metastable limit of supersaturation with respect to at least one of the substances to be crystallized, providing relatively large crystals in said crystallizing zone of such substance so as to cause the crystallization of said substance by growth upon said crystals, and precipitating simultaneously from the solution another substance in the form of relatively fine crystals.

5. A process of crystallization which comprises, flowing a solution by relatively large crystals of one substance while the solution is maintained within the metastable limit of supersaturation with respect to said substance, and while the solution is precipitating another substance in the form of relatively fine crystals, and supplying fresh solution to the crystallizing zone which said fresh solution contains sufficient of both substances so that if immediately reduced to conditions of temperature and concentration existing in said crystallizing zone, such solution would be labile with respect to both substances, and recirculating sufficient of the solution from the crystallizing zone to re-enter with the fresh solution as to prevent the fresh solution from exceeding the metastable limit of supersaturation with respect to the component corresponding to the relatively large crystals.

6. A process of crystallization which comprises, flowing a solution by relatively large crystals of one substance while the solution is maintained within the metastable limit of supersaturation with respect to said substance, and while the solution is precipitating another substance in the form of relatively fine crystals, and supplying fresh solution to the crystallizing zone which said fresh solution contains sufficient of both substances so that if immediately reduced to conditions of temperature and concentration existing in said crystallizing zone, such solution would be labile with respect to both substances, recirculating sufficient of the solution from the crystallizing zone to re-enter with the fresh solution as to prevent the fresh solution from exceeding the metastable limit of supersaturation with respect to the component corresponding to the relatively large crystals, and causing a return of flow in the crystallizing zone to be sufficient to carry away the relatively fine crystals of one of such substances without carrying away the relatively large crystals of the other substance.

7. A process of crystallizing two different substances simultaneously from solution which comprises, cooling the solution so as to cause the solution to become supersaturated with respect to two substances, while maintaining the solution within the metastable limit of supersaturation with respect to at least one of said substances, contacting with the solution sufficient relatively large crystals of said substances to cause the precipitation of said substance by growth of the relatively large crystals, and causing the precipitating of the other substance as relatively fine crystals.

8. A process of crystallizing two different substances simultaneously from solution which comprises, cooling the solution so as to cause the solution to become supersaturated with respect to two substances, while maintaining the solution within the metastable limit of supersaturation with respect to at least one of said substances, contacting with the solution sufficient relatively large crystals of said substances to cause the precipitation of said substance by growth of the relatively large crystals, causing the precipitating of the other substance as relatively fine crystals, and maintaining a flow of solution by the relatively large crystals sufficient to carry away the relatively small crystals without however, removing the relatively large crystals.

9. A process of crystallizing two different substances simultaneously from solution which comprises, cooling the solution so as to cause the solution to become supersaturated with respect to two substances, while maintaining the solution within the metastable limit of supersaturation with respect to at least one of said substances, contacting with the solution sufficient relatively large crystals of said substances to cause the precipitating of said substance by growth of the relatively large crystals, causing the precipitation of the other substance as relatively fine crystals, and separating the relatively large and small crystals from each other by hydraulic classification.

10. A process of crystallizing salts from solution which comprises, cooling the solution to a temperature below the saturation point of said solution with respect to two salts, one of said salts at least being maintained within the metastable limit of supersaturation, flowing said solution by a bed of relatively large crystals of said salt while causing the precipitation of other substance as relatively fine crystals, supplying a fresh solution to the crystallizing operation, and recirculating a part of the solution in the crystallizing operation back to the relatively large crystals with the fresh solution.

Signed at Trona, California, this 17th day of February, 1930.

WILLIAM E. BURKE.
CHARLES F. RITCHIE.
ROBERT B. PEET.